(12) United States Patent
Izumi et al.

(10) Patent No.: US 12,435,236 B2
(45) Date of Patent: *Oct. 7, 2025

(54) COATING LIQUID, COMPOSITE MATERIAL, AND COATING FILM

(71) Applicant: Showa Denko Materials Co., Ltd., Tokyo (JP)

(72) Inventors: Hiroyuki Izumi, Tokyo (JP); Satoshi Takayasu, Tokyo (JP); Naoyoshi Sato, Tokyo (JP); Ai Yokokura, Tokyo (JP); Tomohiko Kotake, Tokyo (JP)

(73) Assignee: Resonac Corporation, Tokyo (JP)

( * ) Notice: Subject to any disclaimer, the term of this patent is extended or adjusted under 35 U.S.C. 154(b) by 729 days.

This patent is subject to a terminal disclaimer.

(21) Appl. No.: 17/601,426

(22) PCT Filed: Mar. 30, 2020

(86) PCT No.: PCT/JP2020/014653
§ 371 (c)(1),
(2) Date: Oct. 4, 2021

(87) PCT Pub. No.: WO2020/209131
PCT Pub. Date: Oct. 15, 2020

(65) Prior Publication Data
US 2022/0195231 A1    Jun. 23, 2022

(30) Foreign Application Priority Data

Apr. 10, 2019    (JP) ................. 2019-075098

(51) Int. Cl.
*C09D 101/28* (2006.01)
*C09D 7/40* (2018.01)

(52) U.S. Cl.
CPC ........... *C09D 101/284* (2013.01); *C09D 7/70* (2018.01)

(58) Field of Classification Search
CPC ................ C09D 101/284; C09D 7/70
USPC ...................................... 106/162.9
See application file for complete search history.

(56) References Cited

U.S. PATENT DOCUMENTS

| 3,367,742 A | 2/1968 | Teicher et al. |
| 4,485,089 A | 11/1984 | Leipold |
| 2020/0048100 A1 | 2/2020 | Yu et al. |

FOREIGN PATENT DOCUMENTS

| CN | 105038445 | 11/2015 |
| CN | 105819457 | 8/2016 |
| CN | 106450116 | 2/2017 |
| CN | 107267006 | 10/2017 |
| CN | 107849287 | 3/2018 |
| EP | 3693424 | 8/2020 |
| GB | 655612 | 7/1951 |
| JP | H10147664 | 6/1998 |
| JP | 2000026609 | 1/2000 |
| JP | 2008031044 | 2/2008 |
| JP | 2012091943 | 5/2012 |
| JP | 2012233110 | 11/2012 |
| JP | 5250900 | 7/2013 |
| JP | 2014035044 | 2/2014 |
| JP | 2017210446 | 11/2017 |
| JP | 2018043927 | 3/2018 |
| JP | 2019119691 | 7/2019 |
| JP | 2019182728 | 10/2019 |
| KR | 20150031621 | 3/2015 |
| WO | 2019069412 | 4/2019 |
| WO | 2019069492 | 4/2019 |
| WO | 2019069494 | 4/2019 |
| WO | 2019069495 | 4/2019 |
| WO | 2020012553 | 1/2020 |
| WO | 2020208756 | 10/2020 |
| WO | 2020209131 | 10/2020 |

OTHER PUBLICATIONS

Machine translation of JP 2018043927 A. (Year: 2018).*
Bae et al. "Alkylation of mixed micro- and nanocellulose to improve dispersion in polylactide". Polym Int 2015; 64: 821-827. (Year: 2015).*
"International Preliminary report on patentability (Form PCT/IB/338) mailed on Aug. 11, 2022, International Preliminary report on patentability (Form PCT/IB/373) issued on Jul. 28, 2022, Written Opinion of the International Searching Authority (Form PCT/ISA/237) mailed on Apr. 14, 2020 of PCT/JP2020/003789", pp. 1-5.
"International Preliminary report on patentability (Form PCT/IB/338) mailed on Oct. 21, 2021, International Preliminary report on patentability (Form PCT/IB/373) issued on Sep. 28, 2021, Written Opinion of the International Searching Authority (Form PCT/ISA/237) mailed on Jun. 23, 2020 of PCT/JP2020/014653", pp. 1-5.
"International Preliminary report on patentability (Form PCT/IB/338) mailed on Aug. 11, 2022, International Preliminary report on patentability (Form PCT/IB/373) issued on Jul. 28, 2022, Written Opinion of the International Searching Authority (Form PCT/ISA/237) mailed on Apr. 6, 2021 of PCT/JP2021/003335", pp. 1-6.

* cited by examiner

*Primary Examiner* — Coris Fung
*Assistant Examiner* — Catriona M Corallo
(74) *Attorney, Agent, or Firm* — JCIPRNET

(57) ABSTRACT

This coating liquid contains: aerogel particles; a water-soluble polymer having a hydrophobic group; a binder resin; and a liquid medium, wherein the water-soluble polymer comprises a cellulose based resin having an alkyl group having 6 to 26 carbon atoms. The coating liquid is capable of forming a coating film having a high filling rate of aerogel particles and an excellent film strength and is excellent in terms of the dispersibility of aerogel particles.

2 Claims, No Drawings

COATING LIQUID, COMPOSITE MATERIAL, AND COATING FILM

CROSS-REFERENCE TO RELATED APPLICATIONS

This application is a 371 application of the International PCT application serial no. PCT/JP2020/014653, filed on Mar. 30, 2020, which claims the priority benefit of Japan Patent Application No. 2019-075098, filed on Apr. 10, 2019. The entirety of each of the above-mentioned patent applications is hereby incorporated by reference herein and made a part of this specification.

TECHNICAL FIELD

The present invention relates to a coating liquid, a composite material, and a coating film.

BACKGROUND ART

Aerogels are known as a material having excellent heat insulating properties. In addition, there has been a proposal of a method in which an aerogel is processed into a particle shape and used as a configuration material of heat insulating materials (for example, Patent Literatures 1 and 2). Patent Literature 1 proposes the use of a particle-shaped aerogel as a filler between resin plates or the like that configure a heat insulating window. Patent Literature 2 describes a method in which a water dispersion liquid containing aerogel particles and an organic fiber is prepared, water is evaporated to obtain an intermediate product, and, furthermore, the intermediate product is molded by pressing to manufacture a heat insulating material (molded article).

REFERENCE LIST

Patent Literature

Patent Literature 1: Japanese Patent Laid-Open No. 2012-91943
Patent Literature 2: Japanese Patent Laid-Open No. 2014-35044

SUMMARY OF INVENTION

Technical Problem

From composite materials having a high filling rate of aerogel particles, excellent heat resistance is expected. However, in an attempt to make such a composite material into a coating liquid, there have been cases where it has become difficult to disperse the aerogel particles in the coating liquid. In addition, for a coating film made of such a composite material, there have been cases where the aerogel particles have been unevenly distributed or a sufficient film strength could not be obtained.

Therefore, an objective of the present invention is to provide a coating liquid that is capable of forming a coating film having a high filling rate of aerogel particles and an excellent film strength and is excellent in terms of the dispersibility of aerogel particles. In addition, another objective of the present invention is to provide a composite material having a high filling rate of aerogel particles and an excellent film strength at the time of forming films. Furthermore, still another objective of the present invention is to provide a coating film having a high filling rate of aerogel particles and an excellent film strength.

Solution to Problem

An aspect of the present invention relates to a coating liquid containing aerogel particles, a water-soluble polymer having a hydrophobic group, and a liquid medium. Since the water-soluble polymer having a hydrophobic group improves the dispersibility of the aerogel particles, such a coating liquid is capable of forming a coating film in which only a small number of aerogel particles are unevenly distributed and the film strength is sufficient.

A content of the aerogel particles may be 70 vol % or more based on a total volume of a solid content.

The hydrophobic group may be an alkyl group having 1 to 26 carbon atoms.

The water-soluble polymer may contain a cellulose-based resin.

The cellulose-based resin may have a structural unit represented by Formula (A-1).

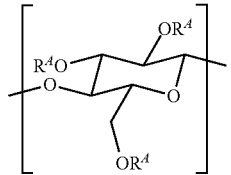

(A-1)

[In the formula, $R^A$ represents a hydrogen atom, an alkyl group, a hydroxyalkyl group, or a group represented by $-R^{A1}-O-R^{A2}$ ($R^{A1}$ represents an alkanediyl group and $R^{A2}$ represents an alkyl group). Three $R^A$'s may be identical to or different from one another. At least one of the three $R^A$'s is an alkyl group or the group represented by $-R^{A1}-O-R^{A2}$.]

The liquid medium may be a water-based medium containing water.

Another aspect of the present invention relates to a composite material containing aerogel particles and a water-soluble polymer having a hydrophobic group.

A content of the aerogel particles may be 70 vol % or more.

The hydrophobic group may be an alkyl group having 1 to 26 carbon atoms.

The water-soluble polymer may contain a cellulose-based resin.

The cellulose-based resin may have a structural unit represented by Formula (A-1).

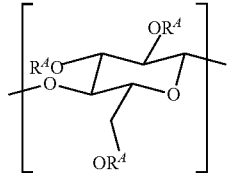

(A-1)

[In the formula, $R^A$ represents a hydrogen atom, an alkyl group, a hydroxyalkyl group, or a group represented by $-R^{A1}-O-R^{A2}$ ($R^{A1}$ represents an alkanediyl group and $R^{A2}$ represents an alkyl group). Three $R^A$'s may be identical to or different from one another. At least one of the three $R^4$'s is an alkyl group or the group represented by —$R^{41}$—O—$R^{42}$.]

Still another aspect of the present invention relates to a coating film that is made of the above-described composite material.

Advantageous Effects of Invention

The present invention is capable of providing a coating liquid that is capable of forming a coating film having a high filling rate of aerogel particles and an excellent film strength and is excellent in terms of the dispersibility of aerogel particles. In addition, the present invention is capable of providing a composite material having a high filling rate of aerogel particles and an excellent film strength at the time of forming films. Furthermore, the present invention is capable of providing a coating film having a high filling rate of aerogel particles and an excellent film strength.

DESCRIPTION OF THE EMBODIMENTS

Hereinafter, a preferable embodiment of the present invention will be described in detail. However, the present invention is not limited to the following embodiment. In the present specification, a numerical range expressed using "to" indicates a range including numerical values before and after "to" as the minimum value and the maximum value, respectively. The expression "A or B" indicates that any one of A and B may be included or both may be included. Unless particularly otherwise described, materials that are exemplified in the present embodiment can be used singly or two or more thereof can be used in combination.

<Coating Liquid>

A coating liquid according to the present embodiment contains aerogel particles, a water-soluble polymer having a hydrophobic group, and a liquid medium. Since the water-soluble polymer having a hydrophobic group improves the dispersibility of the aerogel particles, the coating liquid according to the present embodiment is capable of forming a coating film in which only a small number of aerogel particles are unevenly distributed and the film strength is sufficient.

The content of the aerogel particles in the coating liquid may be, for example, 70 vol % or more and is preferably 72 vol % or more and more preferably 74 vol % or more based on the total volume of the solid content in the coating liquid. In addition, the content of the aerogel particles in the coating liquid may be, for example, 99 vol % or less and is preferably 97 vol % or less based on the total volume of the solid content in the coating liquid.

<Aerogel>

In a narrow sense, a dry gel obtained from a wet gel using the supercritical drying method is referred to as an aerogel, a dry gel obtained by drying in the atmosphere is referred to as a xerogel, and a dry gel obtained by freeze-drying is referred to as a cryogel; however, in the present embodiment, a low-density dry gel obtained not by the above-described drying methods for wet gels will be referred to as "aerogel". That is, in the present embodiment, "aerogel" means "a gel comprised of a microporous solid in which the dispersed phase is a gas", which is an aerogel in a broad sense. Usually, the inside of the aerogel has a net-like fine structure and has a cluster structure in which approximately 2 to 20 nm particle-sized aerogel components bond to each other. Between skeletons that are formed by these clusters, fine pores that are smaller than 100 nm are present. Therefore, in the aerogel, a fine microporous three-dimensional structure is formed.

The aerogel according to the present embodiment is, for example, a silica aerogel containing silica as a main component. As the silica aerogel, for example, a so-called organic-inorganic hybrid silica aerogel into which an organic group (a methyl group or the like) or an organic chain is introduced is exemplified.

Examples of the aerogel according to the present embodiment include the following aspects. The adoption of these aspects makes it easy to obtain an aerogel that is excellent in terms of heat insulating properties, flame retardancy, heat resistance, and flexibility. The adoption of each aspect makes it possible to obtain an aerogel having heat insulating properties, flame retardancy, heat resistance, and flexibility that are intrinsic to each aspect.

(First Aspect)

The aerogel according to the present embodiment may have a structure represented by General Formula (1). The aerogel according to the present embodiment may have a structure represented by General Formula (1a) as a structure including the structure represented by General Formula (1).

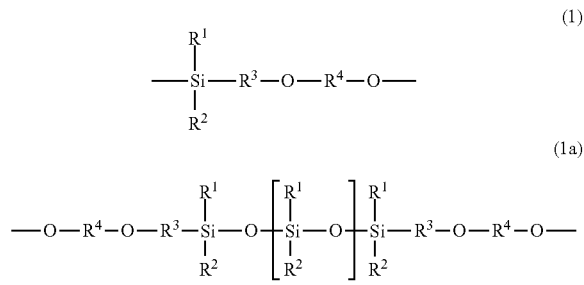

In Formula (1) and Formula (1a), $R^1$ and $R^2$ each independently represent an alkyl group or an aryl group, and $R^3$ and $R^4$ each independently represent an alkylene group. Here, examples of the aryl group include a phenyl group, a substituted phenyl group, and the like. Examples of a substituent in the substituted phenyl group include an alkyl group, a vinyl group, a mercapto group, an amino group, a nitro group, a cyano group, and the like. p represents an integer of 1 to 50. In Formula (1a), two or more $R^1$'s may be identical to or different from each other, and, similarly, two or more $R^2$'s may be identical to or different from each other. In Formula (1a), the two $R^3$'s may be identical to or different from each other, and, similarly, the two $R^4$'s may be identical to or different from each other.

The introduction of the structure represented by Formula (1) or Formula (1a) as an aerogel component into the skeleton of the aerogel produces a flexible aerogel having a low heat conductivity. From such a viewpoint, examples of each of $R^1$ and $R^2$ in Formula (1) and Formula (1a) include an alkyl group having 1 to 6 carbon atoms, a phenyl group, and the like, and examples of the alkyl group include a methyl group and the like. In addition, examples of each of $R^3$ and $R^4$ in Formula (1) and Formula (1a) include an alkylene group having 1 to 6 carbon atoms and the like, and examples of the alkylene group include an ethylene group, a propylene group, and the like. In Formula (1a), p can be set to 2 to 30 and may be 5 to 20.

(Second Aspect)

The aerogel according to the present embodiment has a ladder-type structure including struts and bridges, and the bridge may have a structure represented by General Formula (2). The introduction of such a ladder-type structure as the aerogel component into the skeleton of the aerogel makes it possible to improve heat resistance and mechanical strength. The "ladder-type structure" in the present embodiment is a structure having two struts and bridges that couple the struts together (a structure having a so-called "ladder" form). In the present aspect, the skeleton of the aerogel may be formed of the ladder-type structure, or the aerogel may partially have the ladder-type structure.

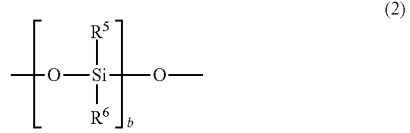

(2)

In Formula (2), $R^5$ and $R^6$ each independently represent an alkyl group or an aryl group, and b represents an integer of 1 to 50. Here, examples of the aryl group include a phenyl group, a substituted phenyl group, and the like. In addition, examples of a substituent in the substituted phenyl group include an alkyl group, a vinyl group, a mercapto group, an amino group, a nitro group, a cyano group, and the like. In a case where b is an integer of 2 or larger in Formula (2), two or more $R^5$'s may be identical to or different from each other, and, similarly, two or more $R^6$'s may be identical to or different from each other.

The introduction of the above-described structure as an aerogel component into the skeleton of the aerogel produces an aerogel having superior flexibility to, for example, aerogels having a structure derived from a ladder-type silsesquioxane of the related art (that is, having a structure represented by General Formula (X)). A silsesquioxane is a polysiloxane having a composition formula of $(RSiO_{1.5})_n$ and may have a variety of skeleton structures such as a cargo-type structure, a ladder-type structure, and a random-type structure. As shown in General Formula (X), in the aerogels having a structure derived from a ladder-type silsesquioxane of the related art, the structure of the bridge is —O—; however, in the aerogel according to the present embodiment, the structure of the bridge is a structure represented by General Formula (2) (polysiloxane structure). Here, the aerogel of the present aspect may further have a structure derived from the silsesquioxane in addition to the structure represented by General Formula (2).

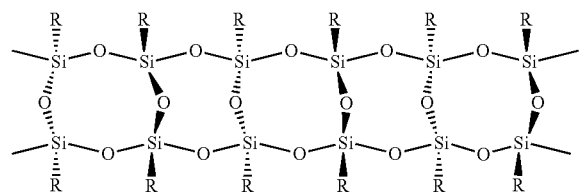

(X)

In Formula (X), R represents a hydroxy group, an alkyl group, or an aryl group.

The structure that acts as the strut, the chain length of the structure, and the spacing between the structures that act as the bridges are not particularly limited; however, from the viewpoint of further improving heat resistance and mechanical strength, the aerogel may have a ladder-type structure represented by General Formula (3) as the ladder-type structure.

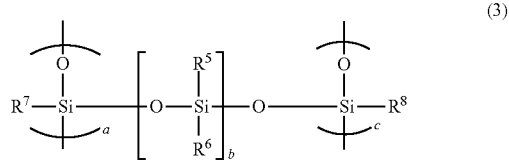

(3)

In Formula (3), $R^5$, $R^6$, $R^7$, and $R^8$ each independently represent an alkyl group or an aryl group, a and c each independently represent an integer of 1 to 3000, and b represents an integer of 1 to 50. Here, examples of the aryl group include a phenyl group, a substituted phenyl group, and the like. In addition, examples of a substituent in the substituted phenyl group include an alkyl group, a vinyl group, a mercapto group, an amino group, a nitro group, a cyano group, and the like. In a case where b is an integer of 2 or larger in Formula (3), two or more $R^5$'s may be identical to or different from each other, and, similarly, two or more $R^6$'s may be identical to or different from each other. In addition, in Formula (3), in a case where a is an integer of 2 or larger, two or more $R^7$'s may be identical to or different from each other, and, similarly, in a case where c is an integer of 2 or larger, two or more $R^8$'s may be identical to or different from each other.

From the viewpoint of obtaining superior flexibility, examples of each of $R^5$, $R^6$, $R^7$, and $R^8$ in Formula (2) and Formula (3) (here, $R^7$ and $R^8$ are only in Formula (3)) independently include an alkyl group having 1 to 6 carbon atoms, a phenyl group, and the like, and examples of the alkyl group include a methyl group and the like. In addition, in Formula (3), a and c can each independently be set to 6 to 2000 and may be 10 to 1000. In addition, in Formula (2) and Formula (3), b can be set to 2 to 30 and may be 5 to 20.

(Third Aspect)

The aerogel according to the present embodiment may be a dried substance of a wet gel that is a condensate of a sol containing at least one selected from the group consisting of a silicon compound having a hydrolyzable functional group or a condensable functional group and a hydrolysis product of a silicon compound having a hydrolyzable functional group (a dried substance obtained by drying a wet gel generated from a sol: a dried substance of a wet gel derived from a sol). The aerogels that have been thus far described may be an aerogel obtained by drying a wet gel generated from a sol containing a silicon compound or the like as described above.

As the silicon compound having a hydrolyzable functional group or a condensable functional group, a polysiloxane compound can be used. That is, the sol may contain at least one compound selected from the group consisting of a polysiloxane compound having a hydrolyzable functional group or a condensable functional group and a hydrolysis product of a polysiloxane compound having a hydrolyzable functional group (hereinafter, referred to as "polysiloxane compound group" in some cases).

The functional group in the polysiloxane compound is not particularly limited and may be a functional group that reacts with the same functional group or reacts with a different functional group. Examples of the hydrolyzable functional group include an alkoxy group. Examples of the condensable functional group include a hydroxyl group, a silanol group, a carboxyl group, a phenolic hydroxyl group, and the like. The hydroxyl group may be contained in a hydroxyl group-containing group such as a hydroxyalkyl group. The polysiloxane compound having a hydrolyzable functional group or a condensable functional group may further have a reactive group that is different from a hydrolyzable functional group or a condensable functional group (a functional group that is neither a hydrolyzable functional group nor a condensable functional group). Examples of the reactive group include an epoxy group, a mercapto group, a glycidoxy group, a vinyl group, an acryloyl group, a methacryloyl group, an amino group, and the like. The epoxy group may be contained in an epoxy group-containing group such as a glycidoxy group. Polysiloxane compounds having these functional group and reactive group may be used singly or two or more polysiloxane compounds may be used in a mixed form. Among these functional groups and reactive groups, examples of a group that improves the flexibility of the aerogel include an alkoxy group, a silanol group, a hydroxyalkyl group, and the like, and, among these, the alkoxy group and the hydroxyalkyl group are capable of further improving the compatibility of the sol. In addition, the number of carbon atoms in the alkoxy group and the hydroxyalkyl group can be set to one to six from the viewpoint of improvement in the reactivity of the polysiloxane compound and a decrease in the heat conductivity of the aerogel and may be two to four from the viewpoint of additional improvement in the flexibility of the aerogel.

Examples of the polysiloxane compound having a hydroxyalkyl group in the molecule include polysiloxane compounds having a structure represented by General Formula (A). The use of the polysiloxane compound having the structure represented by General Formula (A) makes it possible to introduce the structure represented by General Formula (1) and Formula (1a) into the skeleton of the aerogel.

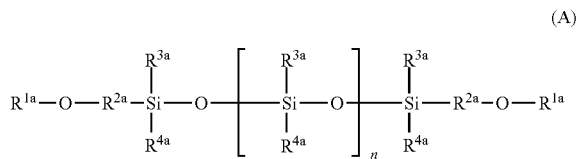

(A)

In Formula (A), $R^{1a}$ represents a hydroxyalkyl group, $R^{2a}$ represents an alkylene group, $R^{3a}$ and $R^{4a}$ each independently represent an alkyl group or an aryl group, and n represents an integer of 1 to 50. Here, examples of the aryl group include a phenyl group, a substituted phenyl group, and the like. In addition, examples of a substituent in the substituted phenyl group include an alkyl group, a vinyl group, a mercapto group, an amino group, a nitro group, a cyano group, and the like. In Formula (A), the two $R^{1a}$'s may be identical to or different from each other, and, similarly, the two $R^{2a}$'s may be identical to or different from each other. In addition, in Formula (A), two or more $R^{3a}$'s may be identical to or different from each other, and, similarly, two or more $R^{4a}$'s may be identical to or different from each other.

The use of a wet gel (generated from a sol) that is a condensate of a sol containing a polysiloxane compound having the above-described structure makes it easier to obtain a flexible aerogel having a low heat conductivity. From such a viewpoint, examples of $R^{1a}$ in Formula (A) include a hydroxyalkyl group having 1 to 6 carbon atoms and the like, and examples of the hydroxyalkyl group include a hydroxyethyl group, a hydroxypropyl group, and the like. In addition, examples of $R^{2a}$ in Formula (A) include an alkylene group having 1 to 6 carbon atoms and the like, and examples of the alkylene group include an ethylene group, a propylene group, and the like. In addition, examples of each of $R^{3a}$ and $R^{4a}$ in Formula (A) include an alkyl group having 1 to 6 carbon atoms, a phenyl group, and the like, and examples of the alkyl group include a methyl group and the like. In addition, in Formula (A), n can be set to 2 to 30 and may be 5 to 20.

As the polysiloxane compound having the structure represented by General Formula (A), it is possible to use a commercially available product, and examples thereof include compounds such as X-22-160AS, KF-6001, KF-6002, and KF-6003 (all manufactured by Shin-Etsu Chemical Co., Ltd.), compounds such as XF42-B0970 and Fluid OFOH 702-4% (all manufactured by Momentive), and the like.

Examples of the polysiloxane compound having an alkoxy group in the molecule include polysiloxane compounds having a structure represented by General Formula (B). The use of the polysiloxane compound having the structure represented by General Formula (B) makes it possible to introduce the ladder-type structure having bridges represented by General Formula (2) or Formula (3) into the skeleton of the aerogel.

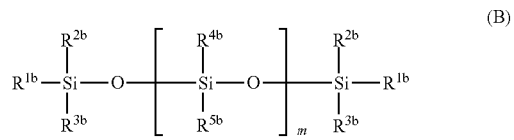

(B)

In Formula (B), $R^{1b}$ represents an alkyl group, an alkoxy group, or an aryl group, $R^{2b}$ and $R^{3b}$ each independently represent an alkoxy group, $R^{4b}$ and $R^{5b}$ each independently represent an alkyl group or an aryl group, and m represents an integer of 1 to 50. Here, examples of the aryl group include a phenyl group, a substituted phenyl group, and the like. In addition, examples of a substituent in the substituted phenyl group include an alkyl group, a vinyl group, a mercapto group, an amino group, a nitro group, a cyano group, and the like. In Formula (B), the two $R^{1b}$'s may be identical to or different from each other, the two $R^{2b}$'s may be identical to or different from each other, and, similarly, the two $R^{3b}$'s may be identical to or different from each other. In addition, in a case where m is an integer of 2 or larger in Formula (B), two or more $R^{4b}$'s may be identical to or different from each other, and, similarly, two or more $R^{5b}$'s may be identical to or different from each other.

The use of a wet gel (generated from a sol) that is a condensate of a sol containing a polysiloxane compound having the above-described structure or a hydrolysis product thereof makes it easier to obtain a flexible aerogel having a low heat conductivity. From such a viewpoint, examples of $R^{1b}$ in Formula (B) include an alkyl group having 1 to 6 carbon atoms, an alkoxy group having 1 to 6 carbon atoms, and the like, and examples of the alkyl group or the alkoxy group include a methyl group, a methoxy group, an ethoxy group, and the like. In addition, examples of each of $R^{2b}$ and $R^{3b}$ in Formula (B) include an alkoxy group having 1 to 6 carbon atoms, and the like, and examples of the alkoxy group include a methoxy group, an ethoxy group, and the like. In addition, examples of each of $R^{4b}$ and $R^{5b}$ in Formula (B) include an alkyl group having 1 to 6 carbon atoms, a phenyl group, and the like, and examples of the alkyl group include a methyl group and the like. In addition, in Formula (B), m can be set to 2 to 30 and may be 5 to 20.

The polysiloxane compound having the structure represented by General Formula (B) can be obtained with appropriate reference to the manufacturing methods reported in Japanese Patent Laid-Open No. 2000-26609, Japanese Patent Laid-Open No. 2012-233110, and the like. In addition, as the polysiloxane compound, XR31-B1410 (manufactured by Momentive) can also be used.

Since an alkoxy group hydrolyzes, there is a possibility of the polysiloxane compound having an alkoxy group remaining as a hydrolysis product in the sol, and the polysiloxane compound having an alkoxy group and a hydrolysis product thereof may be present in a mixed form. In addition, in the polysiloxane compound having alkoxy groups, the alkoxy groups in the molecule may be all hydrolyzed or may be partially hydrolyzed.

These hydrolysis products of the polysiloxane compound having a hydrolyzable functional group or a condensable functional group and the polysiloxane compound having a hydrolyzable functional group may be used singly or two or more hydrolysis products may be used in a mixed form.

In the production of the aerogel according to the present embodiment, a silicon compound other than the above-described polysiloxane compound can be used as the silicon compound having a hydrolyzable functional group or a condensable functional group. That is, the sol containing the above-described silicon compound may contain at least one selected from the group consisting of a silicon compound having a hydrolyzable functional group or a condensable functional group (excluding a polysiloxane compound) and a hydrolysis product of the silicon compound having a hydrolyzable functional group (hereinafter, referred to as "silicon compound group" in some cases) in addition to the polysiloxane compound group or in place of the polysiloxane compound group. The number of silicon in the molecule of the silicon compound can be set to one or two.

The silicon compound having a hydrolyzable functional group in the molecule is not particularly limited, and examples thereof include an alkyl silicon alkoxide and the like. In the alkyl silicon alkoxide, the number of hydrolyzable functional groups can be set to three or less from the viewpoint of improving water resistance. Examples of such an alkyl silicon alkoxide include a monoalkyl trialkoxysilane, a monoalkyl dialkoxysilane, a dialkyl dialkoxysilane, a monoalkyl monoalkoxysilane, a dialkyl monoalkoxysilane, a trialkyl monoalkoxysilane, and the like, and specific examples thereof include methyltrimethoxysilane, methyldimethoxysilane, dimethyldiethoxysilane, dimethyldimethoxysilane, ethyltrimethoxysilane, hexyltrimethoxysilane, and the like. Here, examples of the hydrolyzable functional group include an alkoxy group such as a methoxy group or an ethoxy group and the like.

The silicon compound having a condensable functional group is not particularly limited, and examples thereof include silanetetraol, methylsilanetriol, dimethylsilanediol, phenylsilanetriol, phenylmethylsilanediol, diphenylsilanediol, n-propylsilanetriol, hexylsilanetriol, octylsilanetriol, decylsilanetriol, trifluoropropylsilanetriol, and the like.

The silicon compound having a hydrolyzable functional group or a condensable functional group may further have the above-described reactive group that is different from a hydrolyzable functional group or a condensable functional group (a functional group that is neither a hydrolyzable functional group nor a condensable functional group).

As the silicon compound having three or less hydrolyzable functional groups and a reactive group, it is also possible to use vinyl trimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, 3-acryloxypropyltrimethoxysilane, 3-mere aptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane, and the like.

In addition, as the silicon compound having a condensable functional group and a reactive group, it is also possible to use vinylsilanetriol, 3-glycidoxypropylsilanetriol, 3-glycidoxypropylmethylsilanediol, 3-methacryloxypropylsilanetriol, 3-methacryloxypropylmethylsilanediol, 3-acryloxypropylsilanetriol, 3-mercaptopropylsilanetriol, 3-mercaptopropylmethylsilanediol, N-phenyl-3-aminopropylsilanetriol, N-2-(aminoethyl)-3-aminopropylmethylsilanediol, and the like.

It is also possible to use bistrimethoxysilylmethane, bistrimethoxysilylethane, bistrimethoxysilylhexane, ethyltrimethoxysilane, vinyltrimethoxysilane, and the like that are silicon compounds having three or less hydrolyzable functional groups at the molecular terminal.

The silicon compound having a hydrolyzable functional group or a condensable functional group (excluding a polysiloxane compound) and the hydrolysis product of the silicon compound having a hydrolyzable functional group may be used singly or two or more thereof may be used in a mixed form.

The use of the silicon compound (excluding a polysiloxane compound) makes it possible to introduce the structure represented by General Formulae (4) to (6) into the skeleton of the aerogel. The aerogel according to the present embodiment may have any of these structures singly or two or more thereof.

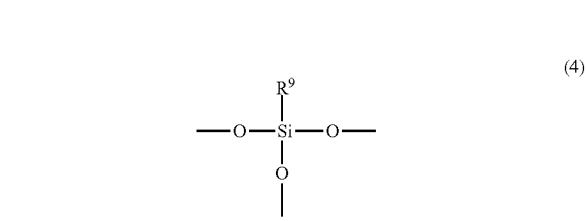

(4)

In Formula (4), $R^9$ represents an alkyl group. Here, examples of the alkyl group include an alkyl group having 1 to 6 carbon atoms and the like, and examples of the alkyl group include a methyl group and the like.

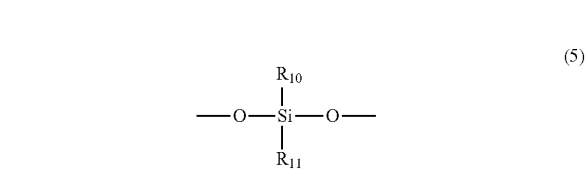

(5)

In Formula (5), $R^{10}$ and $R^{11}$ each independently represent an alkyl group. Here, examples of the alkyl group include an alkyl group having 1 to 6 carbon atoms and the like, and examples of the alkyl group include a methyl group and the like.

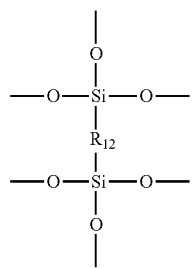

(6)

In Formula (6), $R_{12}$ represents an alkylene group. Here, examples of the alkylene group include an alkylene group having 1 to 10 carbon atoms and the like, and examples of the alkylene group include an ethylene group, a hexylene group, and the like.

(Fourth Aspect)

The aerogel according to the present embodiment may further contain, in addition to the aerogel component, silica particles from the viewpoint of additional toughening and the viewpoint of achieving superior heat insulating properties and superior flexibility. The aerogel containing the aerogel component and silica particles can also be referred to as an aerogel composite. The aerogel composite is considered to have a cluster structure, which is the characteristic of the aerogel, while the aerogel component and the silica particles are in a composited state and to have a fine microporous three-dimensional structure.

The aerogel containing the aerogel component and silica particles can be referred to as a dried substance of a wet gel that is a condensate of a sol containing at least one selected from the group consisting of the above-described silicon compound having a hydrolyzable functional group or a condensable functional group and the above-described hydrolysis product of a silicon compound having a hydrolyzable functional group and the silica particles. Therefore, it is also possible to appropriately apply the descriptions regarding the first aspect to the third aspect to the aerogel according to the present embodiment.

As the silica particles, any silica particles can be used without any limitation, and examples thereof include amorphous silica particles and the like. Examples of the amorphous silica particles include molten silica particles, fumed silica particles, colloidal silica particles, and the like. Among these, colloidal silica particles are highly monodispersive, and it is easy to suppress the aggregation thereof in the sol. The silica particles may be silica particles having a hollow structure, a porous structure, or the like.

The shape of the silica particle is not particularly limited, and examples thereof include a spherical shape, a cocoon form, an associated form, and the like. Among these, the use of spherical particles as the silica particles makes it easy to suppress aggregation in the sol. The average primary particle diameter of the silica particles may be 1 nm or larger, may be 5 nm or larger, and may be 20 mm or larger from the viewpoint of easily imparting an appropriate strength and appropriate flexibility to the aerogel and of easily obtaining an aerogel having excellent shrinkage resistance during drying. The average primary particle diameter of the silica particles may be 500 nm or smaller, may be 300 nm or smaller, and may be 100 mm or smaller from the viewpoint of making it easy to suppress the solid heat conduction of the silica particles and to obtain an aerogel having excellent heat insulating properties. The average primary particle diameter of the silica particles may be 1 to 500 nm, may be 5 to 300 nm, and may be 20 to 100 nm from such viewpoints.

In the present embodiment, the average particle diameter of the aerogel component and the average primary particle diameter of the silica particles can be obtained by directly observing the aerogel using a scanning electron microscope (hereinafter, abbreviated as "SEM"). The "diameter" mentioned herein means a diameter in a case where the cross section of a particle exposed on the cross section of the aerogel is regarded as a circle. In addition, "the diameter in a case where the cross section is regarded as a circle" refers to the diameter of a true circle at the time of replacing the area of the cross section with the true circle having the same area. In the calculation of the average particle diameter, the diameters of circles for 100 particles are obtained, and the average thereof is regarded as the average particle diameter.

The average particle diameter of the silica particles can also be measured from the raw material. For example, the biaxial average primary particle diameter is calculated as described below from the observation results of 20 arbitrary particles with the SEM. That is, when colloidal silica particles that normally have a solid content concentration of approximately 5 to 40 mass % and are dispersed in water are taken as an example, a chip obtained by cutting a pattern wire-attached wafer to 2 cm×2 cm is immersed in a dispersion liquid of the colloidal silica particles for approximately 30 seconds, then, the chip is rinsed with pure water for approximately 30 seconds and dried under a nitrogen flow. After that, the chip is placed on a stage for SEM observation, an accelerating voltage of 10 kV is applied thereto, the silica particles are observed at a magnification of 100,000 times, and an image is captured. Twenty silica particles are arbitrarily selected from the obtained image, and the average of the particle diameters of those particles is regarded as the average particle diameter.

The number of silanol groups per gram of the silica particles may be $10\times10^{18}$ groups/g or more, may be $50\times10^{18}$ groups/g or more, or may be $100\times10^{18}$ groups/g or more from the viewpoint of making it easy to obtain an aerogel having excellent shrinkage resistance. The number of silanol groups per gram of the silica particles may be $1000\times10^{18}$ groups/g or less, may be $800\times10^{18}$ groups/g or less, or may be $700\times10^{18}$ groups/g or less from the viewpoint of making it easy to obtain a homogeneous aerogel. From such viewpoints, the number of silanol groups per gram of the silica particles may be $10\times10^{18}$ to $1000\times10^{18}$ groups/g, may be $50\times10^{18}$ to $800\times10^{18}$ groups/g, or may be $100\times10^{18}$ to $700\times10^{18}$ groups/g.

The content of the polysiloxane compound group that is contained in the sol (the total of the content of the polysiloxane compound having a hydrolyzable functional group or a condensable functional group and the content of the hydrolysis product of the polysiloxane compound having a hydrolyzable functional group) may be 5 parts by mass or more or may be 10 parts by mass or more with respect to 100 parts by mass of the total amount of the sol from the viewpoint of making it easier to obtain favorable responsiveness. The content of the polysiloxane compound group that is contained in the sol may be 50 parts by mass or less or may be 30 parts by mass or less with respect to 100 parts by mass of the total amount of the sol from the viewpoint of making it easier to obtain favorable compatibility. From such viewpoints, the content of the polysiloxane compound group that is contained in the sol may be 5 to 50 parts by mass or may be 10 to 30 parts by mass with respect to 100 parts by mass of the total amount of the sol.

In a case where the sol contains the silicon compound (excluding a polysiloxane compound), the silicon compound group (the total of the content of the silicon compound having a hydrolyzable functional group or a condensable functional group and the content of the hydrolysis product of the silicon compound having a hydrolyzable functional group) may be 5 parts by mass or more or may be 10 parts by mass or more with respect to 100 parts by mass of the total amount of the sol from the viewpoint of making it easier to obtain favorable responsiveness. The content of the silicon compound group that is contained in the sol may be 50 parts by mass or less or may be 30 parts by mass or less with respect to 100 parts by mass of the total amount of the sol from the viewpoint of making it easier to obtain favorable compatibility. From such viewpoints, the content of the silicon compound group that is contained in the sol may be 5 to 50 parts by mass or may be 10 to 30 parts by mass.

In a case where the sol contains both the polysiloxane compound group and the silicon compound group, the ratio between the content of the polysiloxane compound group and the content of the silicon compound group may be 1:0.5 or more or may be 1:1 or more from the viewpoint of making easier to obtain favorable compatibility. The ratio between the content of the polysiloxane compound group and the content of the silicon compound group may be 1:4 or less or may be 1:2 or more from the viewpoint of making easier to suppress the shrinkage of the gel. From such viewpoints, the ratio between the content of the polysiloxane compound group and the content of the silicon compound group may be 1:0.5 to 1:4 or may be 1:1 to 1:2.

In a case where the silica particles are contained in the sol, the content of the silica particles may be 1 part by mass or more or may be 4 parts by mass or more with respect to 100 parts by mass of the total amount of the sol from the viewpoint of making it easy to impart an appropriate strength to the aerogel and to obtain an aerogel having excellent shrinkage resistance during drying. The content of the silica particles may be 20 parts by mass or less or may be 15 parts by mass or less with respect to 100 parts by mass of the total amount of the sol from the viewpoint of making it easy to suppress the solid heat conduction of the silica particles and to obtain an aerogel having excellent heat insulating properties. From such viewpoints, the content of the silica particles may be 1 to 20 parts by mass or may be 4 to 15 parts by mass with respect to 100 parts by mass of the total amount of the sol.

<Aerogel Particles>

The aerogel particles in the present embodiment can be obtained by, for example, crushing a bulk of the aerogel as described below.

The average particle diameter D50 of the aerogel particles can be set to 1 to 1000 μm and may be 3 to 700 μm, 5 to 500 μm, 10 to 100 μm, or 10 to 50 μm. When the average particle diameter D50 of the aerogel particles is 1 μm or more, it becomes easy to obtain aerogel particles that are excellent in terms of dispersibility, handleability, and the like. On the other hand, when the average particle diameter D50 is 1000 μm or less, it becomes easy to obtain aerogel particles that are excellent in terms of dispersibility. The average particle diameter of the aerogel particles can be appropriately adjusted with the crushing method, the crushing conditions, a sieve, the way of classification, and the like.

The average particle diameter D50 of the aerogel particles can be measured by the laser diffraction and scattering method. For example, the aerogel particles are added to a solvent (ethanol) such that the content of the aerogel particles reaches 0.05 to 5 mass %, and the aerogel particles are dispersed by vibrating the aerogel particles for 15 to 30 minutes with a 50 W ultrasonic homogenizer. After that, approximately 10 mL of the dispersion liquid is poured into a laser diffraction and scattering-type particle size distribution measuring instrument, and the particle diameters are measured at 25° C. with the refractive index set to 1.3 and the absorption set to zero. In addition, the particle diameter at a cumulative value of 50% (volume-based) in the particle size distribution is regarded as the average particle diameter D50. As the measuring instrument, for example, Microtrac MT3000 (manufactured by Nikisso Co., Ltd., trade name) can be used.

In addition, as the aerogel particles, a commercially available product can also be used. Examples of the commercially available product of the aerogel particles include ENOVA IC3100 (manufactured by Cabot Corporation), AeroVa (manufactured by JIOS Aerogel Corporation), and the like.

<Method for Manufacturing Aerogel Particles>

The method for manufacturing the aerogel particles is not particularly limited, and the aerogel particles can be manufactured by, for example, the following method.

The aerogel particles of the present embodiment can be manufactured by a manufacturing method mainly including a sol generation step, a wet gel generation step of obtaining a wet gel by gelatinizing a sol obtained in the sol generation step and then aging a gel, a cleansing and solvent substitution step of cleansing the wet gel obtained in the wet gel generation step and (if necessary) substituting the solvent, a drying step of drying the wet gel that has undergone the cleansing and the solvent substitution, and a crushing step of crushing an aerogel obtained by the drying.

In addition, the aerogel particles may also be manufactured by a manufacturing method mainly including the sol generation step, the wet gel generation step, a wet gel crushing step of crushing the wet gel obtained in the set gel generation step, the cleansing and solvent substitution step, and the drying step.

The obtained aerogel particles can be further sorted based on the sizes with a sieve or by classification or the like. When the sizes of the particles are arranged, it is possible to enhance the dispersibility. The "sol" means a state before the occurrence of a gelatinization reaction and, in the present embodiment, a state in which the silicon compound and, possibly, the silica particles are dissolved or dispersed in the solvent. In addition, the wet gel means a solidified substance of a gel in a wet state in which the solidified substance contains a liquid medium but is not fluid.

(Sol Generation Step)

The sol generation step is a step of mixing a silicon compound and, possibly, silica particles (which may be a solvent containing silica particles) to cause a hydrolysis reaction and then generating a sol. In the present step, an acid catalyst may be further added to the solvent in order to accelerate the hydrolysis reaction. In addition, as described in Japanese Patent No. 5250900, it is also possible to add a surfactant, a thermally hydrolyzable compound, or the like to the solvent. Furthermore, components such as carbon graphite, an aluminum compound, a magnesium compound, a silver compound, and a titanium compound may be added to the solvent for the purpose of suppressing thermal radiation or the like.

As the solvent, it is possible to use, for example, water or a liquid mixture of water and an alcohol. Examples of the alcohol include methanol, ethanol, n-propanol, 2-propanol, n-butanol, 2-butanol, t-butanol, and the like. Among these, as an alcohol having a low surface tension and a low boiling point, methanol, ethanol, 2-propanol, and the like are exemplified since these alcohols reduce the interface tension with the gel wall. These alcohols may be used singly or two or more thereof may be used in a mixed form.

For example, in a case where an alcohol is used as the solvent, the amount of the alcohol can be set to 4 to 8 mol with respect to 1 mol of the total amount of the silicon compound group and the polysiloxane compound group and may be 4 to 6.5 mol or may be 4.5 to 6 mol. When the amount of the alcohol is set to 4 mol or more, it becomes easier to obtain favorable compatibility, and, when the amount of the alcohol is set to 8 mol or less, it becomes easier to suppress the shrinkage of the gel.

Examples of the acid catalyst include an inorganic acid such as hydrofluoric acid, hydrochloric acid, nitric acid, sulfuric acid, sulfurous acid, phosphoric acid, phosphorus acid, hypophosphorous acid, bromic acid, chloric acid, chlorous acid, or hypochlorous acid; an acidic phosphate such as acidic aluminum phosphate, acidic magnesium phosphate, or acidic zinc phosphate; an organic carboxylic acid such as acetic acid, formic acid, propionic acid, oxalic acid, malonic acid, succinic acid, citric acid, malic acid, adipic acid, or azelaic acid; and the like. Among these, as the acid catalyst that further improves the water resistance of an aerogel to be obtained, the organic carboxylic acid is exemplified. As the organic carboxylic acid, acetic acid is exemplified, but the organic carboxylic acid may be formic acid, propionic acid, oxalic acid, malonic acid, or the like. These organic carboxylic acids may be used singly or two or more thereof may be used in a mixed form.

The use of the acid catalyst accelerates the hydrolysis reaction of the silicon compound and thereby makes it possible to obtain a sol within a shorter period of time.

The amount of the acid catalyst added can be set to 0.001 to 0.1 parts by mass with respect to 100 parts by mass of the total amount of the polysiloxane compound group and the silicon compound group.

As the surfactant, it is possible to use a nonionic surfactant, an ionic surfactant, or the like. These surfactants may be used singly or two or more thereof may be used in a mixed form.

As the nonionic surfactant, it is possible to use, for example, a compound including a hydrophilic portion such as polyoxyethylene or a hydrophobic portion mainly made of an alkyl group, a compound including a hydrophilic portion such as polyoxypropylene, or the like. Examples of the compound including a hydrophilic portion such as polyoxyethylene and a hydrophobic portion mainly made of an alkyl group include polyoxyethylene nonylphenyl ether, polyoxyethylene octylphenyl ether, polyoxyethylene alkyl ether, and the like. Examples of the compound including a hydrophilic portion such as polyoxypropylene include polyoxypropylene alkyl ether, a block copolymer of polyoxyethylene and polyoxypropylene, and the like.

Examples of the ionic surfactant include a cationic surfactant, an anionic surfactant, an amphoteric surfactant, and the like. Examples of the cationic surfactant include cetyltrimethylammonium bromide, cetyltrimethylammonium chloride, and the like, and examples of the anionic surfactant include sodium dodecyl sulfonate and the like. In addition, examples of the amphoteric surfactant include an amino acid-based surfactant, a betaine-based surfactant, an amine oxide-based surfactant, and the like. Examples of the amino acid-based surfactant include acyl glutamic acid and the like. Examples of the betaine-based surfactant include betaine lauryldimethylaminoacetate, betaine stearyldimethylaminoacetate, and the like. Examples of the amine oxide-based surfactant include lauryl dimethylamine oxide.

These surfactants are considered to perform actions of decreasing the difference in chemical affinity between a solvent in the reaction system and a growing siloxane polymer and of suppressing phase separation in the wet gel generation step described below.

The amount of the surfactant added also depends on the kind of the surfactant or the kind and amount of the silicon compound, but can be set to, for example, 1 to 100 parts by mass with respect to 100 parts by mass of the total amount of the polysiloxane compound group and the silicon compound group. The amount of the surfactant added may be 5 to 60 parts by mass.

The thermally hydrolyzable compound is considered to generate a base catalyst by thermal hydrolysis, to make the reaction solution basic, and to accelerate a sol-gel reaction in the wet gel generation step described below. Therefore, this thermally hydrolyzable compound is not particularly limited as long as the thermally hydrolyzable compound is capable of making the reaction solution basic after hydrolysis, and examples thereof include urea; an acid amide such as formamide, N-methylformamide, N,N-dimethylformamide, acetamide, N-methylacetamide, or N,N-dimethylacetamide; a cyclic nitrogen compound such as hexamethylenetetramine; and the like. Among these, in particular, urea makes it easy to obtain the above-described acceleration effect.

The amount of the thermally hydrolyzable compound added is not particularly limited as long as the sol-gel reaction in the wet gel generation step described below can be sufficiently accelerated. For example, in the case of using urea as the thermally hydrolyzable compound, the amount added can be set to 1 to 200 parts by mass with respect to 100 parts by mass of the total amount of the polysiloxane compound group and the silicon compound group. The amount of the thermally hydrolyzable compound added may be 2 to 150 parts by mass. When the amount added is set to 1 part by mass or more, it becomes easier to obtain favorable reactiveness, and, when the amount added is set to 200 parts by mass or less, it becomes easier to suppress the precipitation of crystals and a decrease in the gel density.

The hydrolysis in the sol generation step also depends on the kinds and amounts of the silicon compound, the silica particles, the acid catalyst, the surfactant, and the like in the liquid mixture, but may be performed, for example, for 10 minutes to 24 hours in a temperature environment of 20° C. to 60° C. or may be performed for five minutes to eight hours in a temperature environment of 50° C. to 60° C. In such a case, the hydrolyzable functional group in the silicon compound is sufficiently hydrolyzed, and it is possible to more reliably obtain the hydrolysis product of the silicon compound.

Here, in a case where the thermally hydrolyzable compound is added to the solvent, the temperature environment in the sol generation step may be adjusted to a temperature at which the hydrolysis of the thermally hydrolyzable compound is suppressed to suppress the gelatinization of the sol. The temperature at this time may be any temperature as long as the hydrolysis of the thermally hydrolyzable compound can be suppressed. For example, in a case where urea is used as the thermally hydrolyzable compound, the temperature environment in the sol generation step can be set to 0° C. to 40° C. and may be 10° C. to 30° C.

(Wet Gel Generation Step)

The wet gel generation step is a step of obtaining a wet gel by gelatinizing the sol obtained in the sol generation step and then aging a gel. In the present step, it is possible to use a base catalyst in order to accelerate the gelatinization.

Examples of the base catalyst include a carbonate such as calcium carbonate, potassium carbonate, sodium carbonate, barium carbonate, magnesium carbonate, lithium carbonate, ammonium carbonate, copper (II) carbonate, iron (II) carbonate, or silver (I) carbonate; a hydrogen carbonate such as calcium hydrogen carbonate, potassium hydrogen carbonate, sodium hydrogen carbonate, or ammonium hydrogen carbonate; an alkali metal hydroxide such as lithium hydroxide, sodium hydroxide, potassium hydroxide, or cesium hydroxide; an ammonium compound such as ammonium hydroxide, ammonium fluoride, ammonium chloride, or ammonium bromide; a basic sodium phosphate salt such as sodium metaphosphate, sodium pyrophosphate, or sodium polyphosphate; an aliphatic amine such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine, or triethanolamine; a nitrogen-containing heterocyclic compound such as morpholin, N-methylmorpholin, 2-methylmorpholin, piperazine and a derivative thereof, piperidine and a derivative thereof, or imidazole and a derivative thereof; and the like. Among these, ammonium hydroxide (ammonia water) is excellent since ammonium hydroxide is highly volatile, less likely to remain in aerogel particles after drying and thus less likely to impair water resistance, and, furthermore, economically efficient. The above-described base catalysts may be used singly or two or more thereof may be used in a mixed form.

The use of the base catalyst makes it possible to accelerate the dehydration condensation reaction or dealcoholization condensation reaction of the silicon compound and the silica particles in the sol and to gelatinize the sol within a shorter period of time. In addition, as a result, it is possible to obtain a wet gel having a higher strength (stiffness). Particularly, since ammonia is highly volatile and less likely to remain in aerogel particles, the use of ammonia as the base catalyst makes it possible to obtain aerogel particles having superior water resistance.

The amount of the base catalyst added can be set to 0.5 to 5 parts by mass with respect to 100 parts by mass of the total amount of the polysiloxane compound group and the silicon compound group and may be 1 to 4 parts by mass. When the amount added is set to 0.5 parts by mass or more, it is possible to perform the gelatinization within a shorter period of time, and, when the amount added is set to 5 parts by mass or less, it is possible to further suppress the degradation of water resistance.

The gelatinization of the sol in the wet gel generation step may be performed in a sealed container so that the solvent and the base catalyst do not volatilize. The gelatinization temperature can be set to 30° C. to 90° C. and may be 40° C. to 80° C. When the gelatinization temperature is set to 30° C. or higher, it is possible to perform the gelatinization within a shorter period of time and to obtain a wet gel having a higher strength (stiffness). In addition, when the gelatinization temperature is set to 90° C. or lower, since it becomes easy to suppress the volatilization of the solvent (particularly, alcohol), it is possible to gelatinize the sol while suppressing volume shrinkage.

The aging in the wet gel generation step may be performed in a sealed container so that the solvent and the base catalyst do not volatilize. The aging makes the bond between the components that configure the wet gel strong and consequently makes it possible to obtain a wet gel having a strength (stiffness) high enough to suppress shrinkage during drying. The aging temperature can be set to 30° C. to 90° C. and may be 40° C. to 80° C. When the aging temperature is set to 30° C. or higher, it is possible to obtain a wet gel having a higher strength (stiffness), and, when the aging temperature is set to 90° C. or lower, since it becomes easy to suppress the volatilization of the solvent (particularly, alcohol), the sol can be gelatinized while suppressing volume shrinkage.

Since there are many cases where it is difficult to determine a point in time when the gelatinization of the sol ends, the gelatinization of the sol and the subsequent aging may be continuously performed by a series of operations.

The gelatinization time and the aging time can be appropriately set depending on the gelatinization temperature and the aging temperature. In a case where the silica particles are contained in the sol, it is possible to shorten, particularly, the gelatinization time compared with a case where the silica particles are not contained. The reason therefor is assumed to be because the silanol group or the reactive group in the silicon compound in the sol forms a hydrogen bond or a chemical bond with the silanol group of the silica particles. The gelatinization time can be set to 10 to 120 minutes and may be 20 to 90 minutes. When the gelatinization time is set to 10 minutes or longer, it becomes easy to obtain a homogeneous wet gel, and, when the gelatinization time is set to 120 minutes or shorter, it becomes possible to simplify the cleansing and solvent substitution step through the drying step described below. For the entire step of the gelatinization and the aging, the total time of the gelatinization time and the aging time can be set to four to 480 hours and may be six to 120 hours. When the total of the gelatinization time and the aging time is set to four hours or longer, it is possible to obtain a wet gel having a higher strength (stiffness), and, when the total of the gelatinization time and the aging time is set to 480 hours or shorter, it becomes easier to maintain the effect of the aging.

In order to decrease the density of aerogel particles to be obtained or increase the average fine pore diameter, the gelatinization temperature and the aging temperature may be increased within the above-described range or the total time of the gelatinization time and the aging time may be extended within the above-described range. In addition, in order to increase the density of aerogel particles to be obtained or decrease the average fine pore diameter, the gelatinization temperature and the aging temperature may be decreased within the above-described range or the total time of the gelatinization time and the aging time may be shortened within the above-described range.

(Wet Gel Crushing Step)

In the case of performing the wet gel crushing step, the wet gel obtained in the wet gel generation step is crushed. The crushing can be performed by, for example, putting the wet gel into a Henschell-type mixer or by performing the wet gel generation step in a mixer and operating the mixer under appropriate conditions (rotation speed and time). In addition, more simply, the crushing can be performed by putting the wet gel into a sealable container or by performing the wet gel generation step in a sealable container and shaking the container using a shaking apparatus such as a shaker for an appropriate time. It is also possible to adjust the particle diameter of the wet gel using a jet mill, a roller mill, a bead mill, or the like as necessary.

(Cleansing and Solvent Substitution Step)

The cleansing and solvent substitution step is a step having a step of cleansing the wet gel obtained by the wet gel generation step or the wet gel crushing step (cleansing step) and a step of substituting a cleansing liquid in the wet gel into a solvent suitable for drying conditions (drying step described below) (solvent substitution step). The cleansing and solvent substitution step can be performed in a manner that the step of cleansing the wet gel is not performed and only the solvent substitution step is performed; however, from the viewpoint of reducing impurities such as an unreacted substance or a by-product in the wet gel and enabling the production of aerogel particles having a higher purity, the wet gel may be cleansed.

In the cleansing step, the wet gel obtained by the wet gel generation step or the wet gel crushing step is cleansed. The cleansing can be repeatedly performed using, for example, water or an organic solvent. At this time, the cleansing efficiency can be improved by heating.

As the organic solvent, it is possible to use a variety of organic solvents such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N,N-dimethylformamide, dimethyl sulfoxide, acetic acid, and formic acid. The above-described organic solvents may be used singly or two or more thereof may be used in a mixed form.

In the solvent substitution step described below, a solvent having a low surface tension can be used in order to suppress the shrinkage of the gel by drying. However, usually, solvents having a low surface tension have an extremely low mutual solubility with water. Therefore, in the case of using a solvent having a low surface tension in the solvent substitution step, as the organic solvent that is used in the cleansing step, a hydrophilic organic solvent having a high mutual solubility with both water and solvents having a low surface tension is exemplified. The hydrophilic solvent that is used in the cleansing step is capable of playing a role of preliminary substitution for the solvent substitution step. Among the above-described organic solvents, examples of the hydrophilic organic solvent include methanol, ethanol, 2-propanol, acetone, methyl ethyl ketone, and the like. Methanol, ethanol, methyl ethyl ketone, and the like are excellent in terms of the economic efficiency.

The amount of water or the organic solvent that is used in the cleansing step can be set to an amount large enough to sufficiently substitute the solvent in the wet gel and cleanse the wet gel. The amount can be set to an amount three to 10 times the volume of the wet gel. The cleansing can be repeated until the water content rate in the cleansed wet gel becomes 10 mass % or less of the mass of silica.

The temperature environment in the cleansing step can be set to a temperature that is equal to or lower than the boiling point of the solvent that is used for cleansing, and, for example, in a case where methanol is used, it is possible to heat the wet gel to a temperature of approximately 30° C. to 60° C.

In the solvent substitution step, the solvent in the cleansed wet gel is substituted into a predetermined solvent for substitution in order to suppress the shrinkage of the aerogel in the drying step. At this time, the substitution efficiency can be improved by heating. As the solvent for substitution, specifically, in a case where the wet gel is dried in the atmosphere at a temperature lower than the critical point of a solvent that is used for drying in the drying step, a solvent having a low surface tension described below is exemplified. In the case of supercritical drying, examples of the solvent for substitution include ethanol, methanol, 2-propanol, dichlorodifluoromethane, carbon dioxide, and a solvent obtained by mixing two or more thereof.

As the solvent having a low surface tension, a solvent having a surface tension of 30 mN/m or less at 20° C. is exemplified. The surface tension may be 25 mN/m or less or 20 mN/m or less. Examples of the solvent having a low surface tension include aliphatic hydrocarbons such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2), and 1-pentene (16.0); aromatic hydrocarbons such as benzene (28.9), toluene (28.5), m-xylene (28.7), and p-xylene (28.3); halogenated hydrocarbons such as dichloromethane (27.9), chloroform (27.2), carbon tetrachloride (26.9), 1-chloropropane (21.8), and 2-chloropropane (18.1); ethers such as ethyl ether (17.1), propyl ether (20.5), isopropyl ether (17.7), butyl ethyl ether (20.8), and 1,2-dimethoxyethane (24.6); ketones such as acetone (23.3), methyl ethyl ketone (24.6), methyl propyl ketone (25.1), and diethyl ketone (25.3); esters such as methyl acetate (24.8), ethyl acetate (23.8), propyl acetate (24.3), isopropyl acetate (21.2), isobutyl acetate (23.7), and ethyl butylate (24.6), and the like (the values in the parentheses indicate surface tensions at 20° C. in a unit of [mN/m]). Among these, the aliphatic hydrocarbons (hexane, heptane, and the like) have a low surface tension and excellent work environment properties. In addition, among these, the use of the hydrophilic organic solvent such as acetone, methyl ethyl ketone, 1,2-dimethoxyethane makes it possible to use the hydrophilic organic solvent also as the organic solvent in the cleansing step. Among these, a solvent having a boiling point of 100° C. or lower at normal pressure may be used since the solvent is easily dried in the drying step described below. The above-described solvents may be used singly or two or more thereof may be used in a mixed form.

The amount of the solvent that is used in the solvent substitution step can be set to an amount large enough to sufficiently substitute the solvent in the cleansed wet gel. The amount can be set to an amount three to 10 times the volume of the wet gel.

The temperature environment in the solvent substitution step can be set to a temperature that is equal to or lower than the boiling point of the solvent that is used for substitution, and, for example, in a case where heptane is used, it is possible to heat the wet gel to a temperature of approximately 30° C. to 60° C.

In a case where the silica particles are contained in the gel, the solvent substitution step is not essential. A mechanism is assumed as described below. That is, since the silica particles function as a support of the three-dimensional net-like skeleton, the skeleton is supported, and the shrinkage of the gel in the drying step is suppressed. Therefore, it is considered that the gel can be subjected to the drying step as it is without substituting the solvent that has been used for the cleansing. As described above, the use of the silica particles makes it possible to simplify the cleansing and solvent substitution step through the drying step.

(Drying Step)

In the drying step, the wet gel that has undergone the cleansing and the solvent substitution (if necessary) as described above is dried. This makes it possible to obtain an aerogel (aerogel blocks or aerogel particles). That is, it is possible to obtain an aerogel formed by drying the wet gel generated from the sol.

The drying method is not particularly limited, and well-known normal pressure drying, supercritical drying, or freeze drying can be used. Among these, normal pressure drying or supercritical drying can be used from the viewpoint of making it easy to produce an aerogel having a low density. In addition, normal pressure drying can be used from the viewpoint of making it possible to produce an aerogel at a low cost. In the present embodiment, the normal pressure means 0.1 MPa (atmospheric pressure).

An aerogel can be obtained by drying the wet gel that has undergone the cleansing and the solvent substitution (if necessary) at a temperature lower than the supercritical point of the solvent that is used for drying in the atmosphere. The drying temperature varies with the kind of the substituted solvent (in a case where the solvent substitution is not performed, the solvent that is used for the cleansing), but can be set to 20° C. to 150° C. in consideration of the fact that, particularly, drying at high temperatures makes the evaporation rate of the solvent fast and there are cases where large cracks are generated in the gel. The drying temperature may be 60° C. to 120° C. In addition, the drying time varies with the volume of the wet gel and the drying temperature, but can be set to four to 120 hours. Accelerating the drying by applying a pressure lower than the supercritical point to an extent that the productivity is not impaired is also regarded as the normal pressure drying.

The aerogel can also be obtained by the supercritical drying of the wet gel that has undergone the cleansing and the solvent substitution (if necessary). The supercritical drying can be performed by a well-known method. Examples of the method for the supercritical drying include a method in which the solvent is removed at a temperature and a pressure that are equal to or higher than the supercritical point of the solvent that is contained in the wet gel. Alternatively, examples of the method for the supercritical drying include a method in which all or part of the solvent that is contained in the wet gel is substituted into carbon dioxide having a lower critical point than the solvent by immersing the wet gel in liquefied carbon dioxide under conditions of, for example, 20° C. to 25° C. and approximately 5 to 20 MPa and then the carbon dioxide is removed singly or a mixture of the carbon dioxide and the solvent is removed.

The aerogel obtained by the above-described normal pressure drying or supercritical drying may be, furthermore, additionally dried at normal pressure and 105° C. to 200° C. for approximately 0.5 to two hours. This makes it easier to obtain an aerogel having a low density and small fine pores. The additional drying may be performed at normal pressure and 150° C. to 200° C.

[Crushing Step]

In a case where the wet gel crushing step is not performed, aerogel particles are obtained by crushing the aerogel obtained by the drying (aerogel blocks). For example, the aerogel particles can be obtained by putting the aerogel into a jet mill, a roller mill, a bead mill, a hammer mill, or the like and operating the jet mill or the like at an appropriate rotation speed for an appropriate time.

<Water-Soluble Polymer>

In the present embodiment, the water-soluble polymer needs to have a hydrophilic group and to be water-soluble.

Examples of the hydrophilic group include an alkyl group (preferably a long-chain alkyl group having 6 to 26 carbon atoms), an ester group, an alkoxy group, a halogen, and the like. Among these, the hydrophilic group is preferably an alkyl group, more preferably a long-chain alkyl group having 8 to 26 carbon atoms, still more preferably a long-chain alkyl group having 10 to 26 carbon atoms, far still more preferably a long-chain alkyl group having 12 to 26 carbon atoms, and may be a long-chain alkyl group having 15 to 26 carbon atoms.

Examples of the water-soluble polymer include a modified carboxyvinyl polymer, modified polyether urethane, a cellulose-based resin, polyethylene oxide, polyvinyl alcohol, a polyacrylic acid salt, polyvinylpyrrolidone, a dextrin-based resin, a chitin-based resin, a chitosan-based resin, and the like.

As the water-soluble polymer, a cellulose-based resin can be preferably used. Examples of the cellulose-based resin include methyl cellulose, carboxymethyl cellulose, hydroxyethyl cellulose, hydroxypropyl methyl cellulose, and modified resins obtained by further modifying (for example, hydrophobizing) these.

As the cellulose-based resin, a cellulose-based resin having an alkyl group is preferable, and a cellulose-based resin having a long-chain alkyl group having 6 to 26 carbon atoms is more preferable. Such a cellulose-based resin makes the effect of the present invention more significantly exhibited. The number of carbon atoms in the long-chain alkyl group is preferably 8 to 26, more preferably 10 to 26, still more preferably 12 to 26, and far still more preferably 15 to 26.

As the cellulose-based resin, for example, a cellulose-based resin having a structural unit represented by Formula (A-1) is preferable.

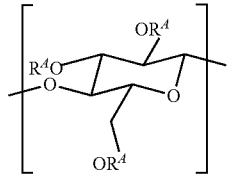

(A-1)

In Formula (A-1), $R^A$ represents a hydrogen atom, an alkyl group, a hydroxyalkyl group, or a group represented by —$R^{A1}$—O—$R^{A2}$ ($R^{A1}$ represents an alkanediyl group or a hydroxyalkanediyl group and $R^{A2}$ represents an alkyl group). Three $R^A$'s may be identical to or different from one another. Here, at least one of the three $R^A$'s is an alkyl group or the group represented by —$R^{A1}$—O—$R^{A2}$.

As the alkyl group as $R^A$ in Formula (A-1), an alkyl group having 1 to 26 carbon atoms is preferable. In addition, the alkyl group as $R^A$ is more preferably a short-chain alkyl group having 1 to 3 carbon atoms or a long-chain alkyl group having 6 to 26 carbon atoms. The number of carbon atoms in the long-chain alkyl group is preferably 8 to 26, more preferably 10 to 26, still more preferably 12 to 26, and far still more preferably 15 to 26.

As the hydroxyalkyl group as $R^A$ in Formula (A-1), a hydroxyalkyl group having 1 to 26 carbon atoms is preferable, a hydroxyalkyl group having 1 to 10 carbon atoms is more preferable, and a hydroxyalkyl group having 1 to 5 carbon atoms is still more preferable.

As the alkanediyl group as $R^{A1}$ in Formula (A-1), an alkanediyl group having 1 to 26 carbon atoms is preferable, an alkanediyl group having 1 to 10 carbon atoms is more preferable, and an alkanediyl group having 1 to 5 carbon atoms is still more preferable. In addition, the hydroxyalkanediyl group as $R^{A1}$ is preferably a hydroxyalkanediyl group having 1 to 26 carbon atoms, more preferably a hydroxyalkanediyl group having 1 to 10 carbon atoms, and still more preferably a hydroxyalkanediyl group having 1 to 5 carbon atoms.

As $R^{42}$ in Formula (A-1), an alkyl group having 1 to 26 carbon atoms is preferable. In addition, the alkyl group as $R^{42}$ is more preferably a short-chain alkyl group having 1 to 3 carbon atoms or a long-chain alkyl group having 6 to 26 carbon atoms and more preferably a long-chain alkyl group. The number of carbon atoms in the long-chain alkyl group is preferably 8 to 26, more preferably 10 to 26, still more preferably 12 to 26, and far still more preferably 15 to 26.

In Formula (A-1), it is preferable that at least one of the three $R^4$'s is a long-chain alkyl group or at least one of the three $R^4$'s is the group represented by —$R^{41}$—O—$R^{42}$ and $R^{42}$ is a long-chain alkyl group.

In the cellulose-based resin, the content of the long-chain alkyl group having 6 to 26 carbon atoms is preferably 0.01 to 5 mass % and more preferably 0.01 to 3 mass % based on the total amount of the cellulose-based resin.

The content of the water-soluble polymer in the coating liquid according to the present embodiment may be, for example, 0.01 vol % or more and is preferably 0.1 vol % or more and more preferably 0.3 vol % or more based on the total volume of the solid content in the coating liquid. In addition, the content of the water-soluble polymer may be, for example, 10 vol % or less and is preferably 5 vol % or less and more preferably 3 vol % or less based on the total volume of the solid content in the coating liquid.

<Liquid Medium>

As the liquid medium, a water-based solvent containing water is preferable. The water-based solvent may contain an organic solvent in addition to water. The organic solvent needs to be compatible with water, and examples thereof include alcohols such as methanol, ethanol, isopropanol, butanol, ethylene glycol, and propylene glycol; ethers such as diethyl ether, tetrahydrofuran, and 1,4-dioxane; ketones such as acetone and methyl ethyl ketone; carboxylic acids such as acetic acid and propionic acid; nitrogen-containing compounds such as acetonitrile, dimethylformamide, and triethylamine; and the like.

In the coating liquid according to the present embodiment, the content of the liquid medium is not particularly limited and may be appropriately changed depending on a desired viscosity or the like of the coating liquid. For example, the content of the liquid medium may be an amount at which the solid content concentration of the coating liquid falls into a preferable range described below.

The solid content concentration of the coating liquid may be, for example, 10 mass % or more and is preferably 15 mass % or more and more preferably 20 mass % or more. In addition, the solid content concentration of the coating liquid may be, for example, 70 mass % or less and is preferably 60 mass % or less and more preferably 50 mass % or less.

<Other Components>

The coating liquid according to the present embodiment may further contain components other than the aerogel particles, the water-soluble polymer, and the liquid medium.

The coating liquid according to the present embodiment may further contain, for example, a binder resin. Examples of the binder resin include an epoxy resin, a silicone resin, a phenolic resin, a urea resin, a melamine resin, a polyurethane resin, a polyethylene resin, a polypropylene resin, a polystyrene resin, a polyester resin, an acrylic resin, a polyvinyl chloride resin, a polyvinyl acetate resin, a polyamide resin, a polyimide resin, a polyvinyl-based resin, and the like. Among these, a silicone resin, an acrylic resin, a phenolic resin, a polyester resin, and the like can be preferably used from the viewpoint of heat resistance and strong toughness.

In a case where the coating liquid according to the present embodiment contains the binder resin, the content of the binder resin may be, for example, 30 vol % or less and is preferably 28 vol % or less and more preferably 25 vol % or less based on the total volume of the solid content. In addition, the content of the binder resin may be, for example, 0.1 vol % or more or 1 vol % or more based on the total volume of the solid content.

In addition, a composite material according to the present embodiment may further contain a viscosity improver, a fibrous substance, a pigment, a levelling agent, and the like as components other than the above-described components.

Examples of the viscosity improver include fumed silica, the fine particles of clay mineral, and the like.

The fibrous substance is capable of developing an anchoring function between the aerogel particles and is capable of further improving the strength of a coating film made of the composite material. The fibrous substance is not particularly limited, and examples thereof include an organic fiber and an inorganic fiber. Examples of the organic fiber include a polyamide-based fiber, a polyimide-based fiber, a polyvinyl alcohol-based fiber, a polyvinylidene chloride-based fiber, a polyvinyl chloride-based fiber, a polyester-based fiber, a polyacrylonitrile-based fiber, a polyethylene-based fiber, a polypropylene-based fiber, a polyurethane-based fiber, a phenolic fiber, a polyether ester-based fiber, a polylactic acid-based fiber, a polycarbonate-based fiber, and the like. Examples of the inorganic fiber include a glass fiber, a carbon fiber, a ceramic fiber, a metal fiber, and the like.

According to the coating liquid according to the present embodiment, it is possible to easily form a coating film made of the composite material described below by the application of the coating liquid and the removal of the liquid medium.

The method for applying the coating liquid is not particularly limited, and examples thereof include dip coating, spray coating, spin coating, roll coating, and the like.

The method for removing the liquid medium from the applied coating liquid is not particularly limited, and examples thereof include a method in which a heating (for example, 40° C. to 150° C.) treatment, a depressurization (for example, 10000 Pa or lower) treatment, or both treatments are performed.

An object to which the coating liquid is applied is not particularly limited. The material that configures the object may be, for example, metal, ceramic, glass, a resin, a composite material thereof, or the like. In addition, the form of the object may be appropriately selected depending on the intended use, the material, or the like and may be, for example, a block shape, a sheet shape, a powder shape, a fibrous shape, or the like.

<Composite Material and Coating Film>

The composite material according to the present embodiment contains aerogel particles and a water-soluble polymer. The composite material according to the present embodiment may be a material obtained by removing the liquid medium from the above-described coating liquid. That is, as individual components in the composite material, the same components as the individual components in the above-described coating liquid can be exemplified, and the contents of the individual components in the composite material may be the same as the contents of the individual components in the above-described coating liquid.

The coating film according to the present embodiment is made of the above-described composite material. The coating film according to the present embodiment may be a coating film formed by the application of the coating liquid and the removal of the liquid medium.

The thickness of the coating film is not particularly limited and may be, for example, 0.01 to 30 mm or 0.1 to 20 mm.

The composite material and the coating film according to the present embodiment have excellent heat insulating properties, heat resistance, flame retardancy, and the like that are derived from the aerogel. Therefore, the composite material and the coating film can be applied to uses as heat insulating materials in extremely low-temperature containers, the space field, the construction field, the automotive field, the home appliances field, the semiconductor field, industrial equipment, and the like. The composite material and the coating film can be used as a water repellent material, a sound-absorbing material, a vibration-damping material, a catalyst carrier material, and the like in addition to in the uses as heat insulating materials.

Hitherto, the preferable embodiment of the present invention has been described, but the present invention is not limited to the above-described embodiment.

EXAMPLES

Hereinafter, the present invention will be described in more detail with examples, but the present invention is not limited to these examples.

Production Example 1

(Production of Aerogel Particles A)

PL-2L (manufactured by Fuso Chemical Co., Ltd., trade name) (100.0 parts by mass) as a silica particle-containing raw material, water (80.0 parts by mass), acetic acid (0.5 parts by mass) as an acid catalyst, cetyltrimethylammonium bromide (manufactured by Wako Pure Chemical Industries, Ltd.) (1.0 part by mass) as a cationic surfactant, and urea (150.0 parts by mass) as a thermally hydrolyzable compound were mixed together, methyltrimethoxysilane (manufactured by Shin-Etsu Chemical Co., Ltd., trade name: KBM-13) (60.0 parts by mass), dimethyldimethoxysilane (manufactured by Shin-Etsu Chemical Co., Ltd., trade name: KBM-22) (20.0 parts by mass), and a both-terminal bifunctional alkoxy-modified polysiloxane compound having a structure represented by General Formula (B) (hereinafter, referred to as "polysiloxane compound A") (20.0 parts by mass) were added thereto as silicon compounds, and these components were reacted at 25° C. for two hours, thereby obtaining a sol. The obtained sol was gelatinized at 60° C. and then aged at 60° C. for 48 hours, thereby obtaining a wet gel.

The "polysiloxane compound A" was synthesized as described below. First, in a three-neck flask (1 L) including a stirrer, a thermometer, and a Dimroth cooling tube, dimethylpolysiloxane having silanol groups at both terminals XC96-723 (manufactured by Momentive Performance Materials Japan LLC, trade name) (100.0 parts by mass), methyl trimethoxysilane (181.3 parts by mass), and t-butylamine (0.50 parts by mass) were mixed and reacted together at 50° C. for five hours. After that, this reaction liquid was heated at a reduced pressure of 1.3 kPa and 140° C. for two hours to remove a volatile component, thereby obtaining the both-terminal bifunctional alkoxy-modified polysiloxane compound (polysiloxane compound A).

After that, the obtained wet gel was moved to a plastic bottle, sealed, and then crushed at 27,000 rpm for 10 minutes using an extreme mill (manufactured by As One Corporation, MX-1000XTS), thereby obtaining a particle-shaped wet gel. The obtained particle-shaped wet gel was immersed in methanol (2500.0 parts by mass) and cleansed at 25° C. for 24 hours. This cleansing operation was performed a total of three times while changing the methanol to new methanol. Next, the cleansed particle-shaped wet gel was immersed in heptane, which is a low-surface tension solvent, (2500.0 parts by mass), and the solvent was substituted at 25° C. for 24 hours. This solvent substitution operation was performed a total of three times while changing the heptane to new heptane. The particle-shaped wet gel that had undergone the cleansing and the solvent substitution was dried at normal pressure and 40° C. for 96 hours and then further dried at 150° C. for two hours. Finally, the particle-shaped wet gel was sifted with a sieve (manufactured by Tokyo Screen Co., Ltd., mesh: 45 μm, and wire diameter: 32 μm), thereby obtaining aerogel particles A having structures represented by General Formulae (3), (4), and (5).

Example 1

(Preparation of Coating Liquid)

SANGELOSE 90 L (manufactured by Daido Chemical Corporation) (4 parts by mass) as a water-soluble polymer, isopropyl alcohol (manufactured by Wako Pure Chemical Industries, Ltd., reagent) (20 parts by mass), and hot water (350 parts by mass) were prepared in a 500 mL separable flask and stirred at 200 rpm for one minute using a mechanical stirrer, thereby obtaining a dispersion liquid. Subsequently, while the flask was cooled in an ice water bath, the dispersion liquid was stirred at 200 rpm using the mechanical stirrer to dissolve SANGELOSE 90 L, thereby obtaining a pregel that was an aqueous solution of SANGELOSE 90 L. The pregel (374 parts by mass) and an acrylic resin (manufactured by Nihon Kasei Co., Ltd., trade name: KH-CT-865) (100 parts by mass) were prepared in a planetary mixer (manufactured by PRIMIX Corporation, 2P-1 type) and stirred at 100 rpm. Subsequently, the aerogel particles A (100 parts by mass) was added five separate times while being stirred at 100 rpm, thereby obtaining a coating liquid. In the coating liquid, the content of the aerogel particles was 85.2 vol %, the content of the water-soluble polymer was 0.6 vol %, and the content of a binder resin was 14.2 vol % based on the total volume of the solid content.

The obtained coating liquid was visually observed, and the dispersibility was evaluated into grade A (a case where the aerogel particles were favorably dispersed) and grade B (a case where the aerogel particles were separated, aggregated, or deposited). The results are shown in Table 1.

(Formation of Coating Film)

The coating liquid was applied onto an aluminum foil (manufactured by UACJ Corporation, trade name MYFOIL thick type 50, thickness: 50 μm) such that the thickness was made to become 2 mm or 3 mm with a metal spatula. In addition, the coating liquid was left to stand at room temperature (23° C.) for 12 hours to remove the liquid medium from the coating liquid, thereby obtaining an aluminum foil-attached coating film. The aluminum foil was peeled off from the obtained aluminum foil-attached coating film, thereby producing a coating film for performance evaluation. The tensile strength and heat insulating properties of the obtained coating film were measured by the following methods.

(Measurement of Tensile Strength)

The obtained coating film was processed to a size of 2×5×50 mm, thereby producing a measurement sample. As a measuring instrument, a compact tabletop tester (EZ Test) (manufactured by Shimadzu Corporation, trade name) was used. As a load cell, 500 N was used. The sample was set using screw-type planar clamping jaws disposed vertically with the vertical distance set to 25 mm and pulled apart at a rate of 2.5 mm/min. The measurement was terminated when the sample broke.

(Measurement of Heat Insulating Properties)

The obtained coating film was processed to a size of 200×200×3 mm, thereby producing a measurement sample. The heat conductivity of the obtained coating film was measured by a steady method with a heat conductivity measuring instrument "HFM-446" (manufactured by NETZSCH Group, trade name). The results are shown in Table 1.

Example 2

(Preparation of Coating Liquid)

SANGELOSE 90 L (manufactured by Daido Chemical Corporation) (1 part by mass), isopropyl alcohol (manufactured by Wako Pure Chemical Industries, Ltd., reagent) (20 parts by mass), and hot water (250 parts by mass) were prepared in a 500 mL separable flask and stirred at 200 rpm for one minute using a mechanical stirrer, thereby obtaining a dispersion liquid. Subsequently, while the flask was cooled in an ice water bath, the dispersion liquid was stirred at 200 rpm using the mechanical stirrer to dissolve SANGELOSE 90 L, thereby obtaining a pregel that was an aqueous solution of SANGELOSE 90 L. The pregel (271 parts by mass) and an acrylic resin (manufactured by DIC Corporation, trade name: VONCOAT DV759-EF) (200 parts by mass) were prepared in a planetary mixer (manufactured by PRIMIX Corporation, 2P-1 type) and stirred at 100 rpm. Subsequently, an aerogel powder (manufactured by JIOS Aerogel Corporation, AeroVa) (100 parts by mass) was added five separate times while being stirred at 100 rpm, thereby obtaining a coating liquid. In the coating liquid, the content of the aerogel particles was 88.1 vol %, the content of the water-soluble polymer was 0.1 vol %, and the content of a binder resin was 11.7 vol % based on the total volume of the solid content.

The obtained coating liquid was visually observed, and the dispersibility was evaluated into grade A (a case where the aerogel particles were favorably dispersed) and grade B (a case where the aerogel particles were separated, aggregated, or deposited). The results are shown in Table 1.

(Formation of Coating Film)

The coating liquid was applied onto an aluminum foil (manufactured by UACJ Corporation, trade name MYFOIL thick type 50, thickness: 50 μm) such that the thickness was made to become 2 mm or 3 mm with an airless spray gun (manufactured by Graco Inc., ULTRA). In addition, the coating liquid was left to stand at room temperature (23° C.) for 12 hours to remove the liquid medium from the coating liquid, thereby obtaining an aluminum foil-attached coating film. The aluminum foil was peeled off from the obtained aluminum foil-attached coating film, thereby producing a coating film for performance evaluation. The tensile strength and heat insulating properties of the obtained coating film were measured by the same methods as in Example 1. The results are shown in Table 1.

Example 3

(Preparation of Coating Liquid)

NATOSOL PLUS GRADE (manufactured by Aquaron) (10 parts by mass), isopropyl alcohol (manufactured by Wako Pure Chemical Industries, Ltd., reagent) (10 parts by mass), and water (50 parts by mass) were prepared in a 500 mL separable flask and stirred at 500 rpm for 10 minutes using a mechanical stirrer, thereby obtaining a pregel. The pregel (70 parts by mass) and a silicone resin (manufactured by Shin-Etsu Chemical Co., Ltd., trade name: POLON-MF-56) (500 parts by mass) were prepared in a planetary mixer (manufactured by PRIMIX Corporation, 2P-1 type) and stirred at 100 rpm. Subsequently, an aerogel powder (manufactured by Cabot Corporation, ENOVA IC3100) (100 parts by mass) was added five separate times while being stirred at 100 rpm, thereby obtaining a coating liquid. In the coating liquid, the content of the aerogel particles was 74.1 vol %, the content of the water-soluble polymer was 1.2 vol %, and the content of a binder resin was 24.7 vol % based on the total volume of the solid content.

The obtained coating liquid was visually observed, and the dispersibility was evaluated into grade A (a case where the aerogel particles were favorably dispersed) and grade B (a case where the aerogel particles were separated, aggregated, or deposited). The results are shown in Table 1.

(Formation of Coating Film)

The coating liquid was applied onto an aluminum foil (manufactured by UACJ Corporation, trade name MYFOIL thick type 50, thickness: 50 μm) such that the thickness was made to become 2 mm or 3 mm with a metal spatula. In addition, the coating liquid was left to stand at room temperature (23° C.) for 12 hours to remove the liquid medium from the coating liquid, thereby obtaining an aluminum foil-attached coating film. The aluminum foil was peeled off from the obtained aluminum foil-attached coating film, thereby producing a coating film for performance evaluation. The tensile strength and heat insulating properties of the obtained coating film were measured by the same methods as in Example 1. The results are shown in Table 1.

Comparative Example 1

An acrylic resin (manufactured by DIC Corporation, trade name: VONCOAT DV750-EF) (200 parts by mass) was prepared in a planetary mixer (manufactured by PRIMIX Corporation, 2P-1 type), and the aerogel particles A (100 parts by mass) was added five separate times while being stirred at 100 rpm, thereby obtaining a coating liquid.

The obtained coating liquid was visually observed, and the dispersibility was evaluated into grade A (a case where the aerogel particles were favorably dispersed) and grade B (a case where the aerogel particles were separated, aggregated, or deposited). The results are shown in Table 1.

(Formation of Coating Film)

The formation of a coating film using the coating liquid obtained in Comparative Example 1 was tested, but the aerogel particles were separated in the coating liquid, which made the formation of a homogeneous coating film difficult.

TABLE 1

| | Example 1 | Example 2 | Example 3 | Comparative Example 1 |
|---|---|---|---|---|
| Dispersibility of coating liquid | A | A | A | B |
| Tensile strength of coating film (MPa) | 0.4 | 0.3 | 0.2 | — |
| Heat insulating properties of coating film (mW/m · K) | 32 | 27 | 30 | — |

What is claimed is:

1. A coating liquid, comprising:
aerogel particles;
a water-soluble polymer having a hydrophobic group;
a binder resin; and
a liquid medium comprising water,
wherein the water-soluble polymer comprises a cellulose-based resin having an alkyl group having 6 to 26 carbon atoms.

2. The coating liquid according to claim 1,
wherein a content of the aerogel particles is 70 vol % or more based on a total volume of a solid content.

* * * * *